Sept. 1, 1970 V. C. REES ET AL 3,526,757
CONTROL APPARATUS
Filed July 25, 1967 4 Sheets-Sheet 2

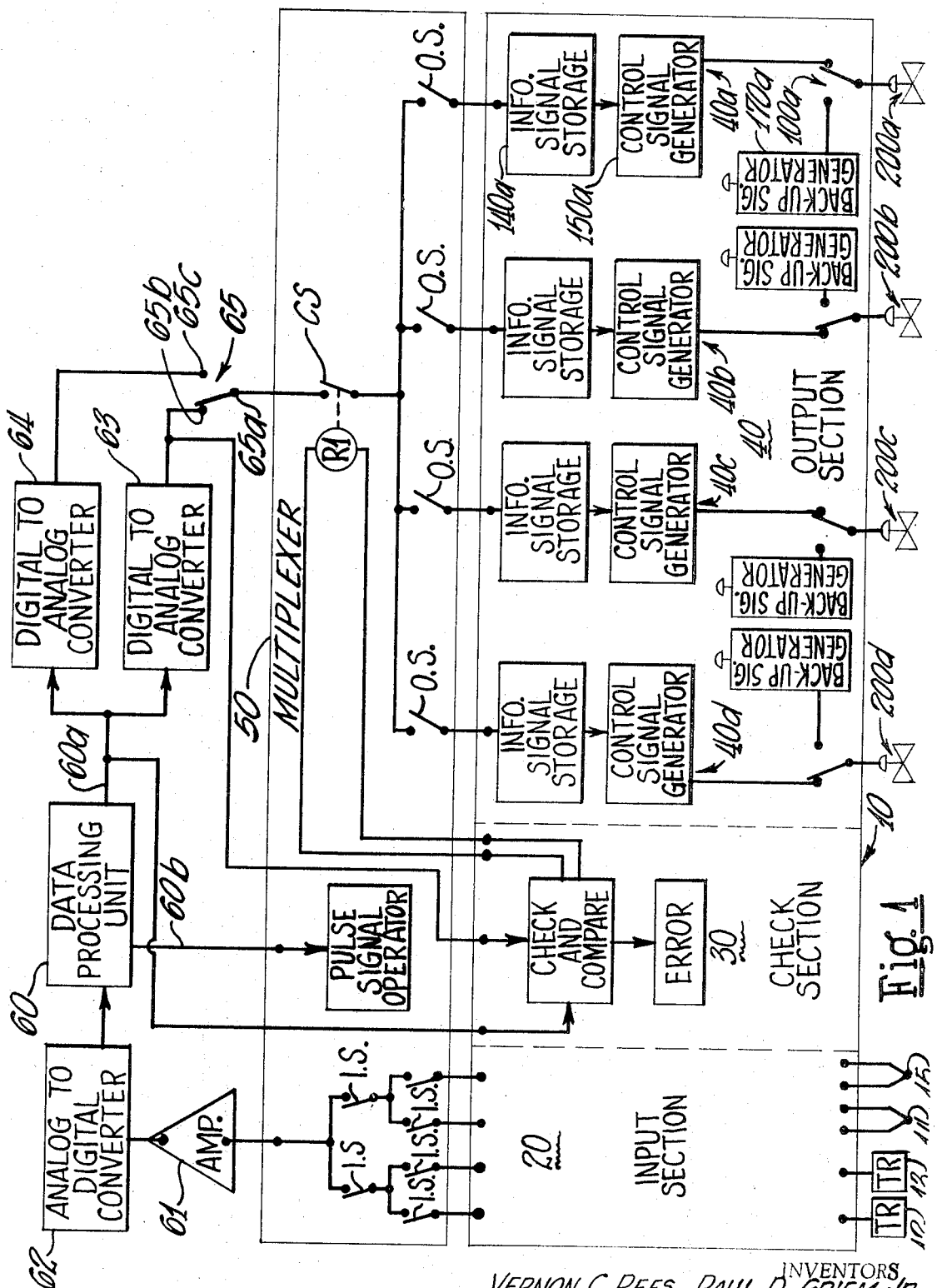

INVENTORS
VERNON C. REES, PAUL D. GRIEM, JR.,
JOHN F. MADDUX & ROBERT R. HUDGINS
BY
Staelin & Overman
ATTORNEYS

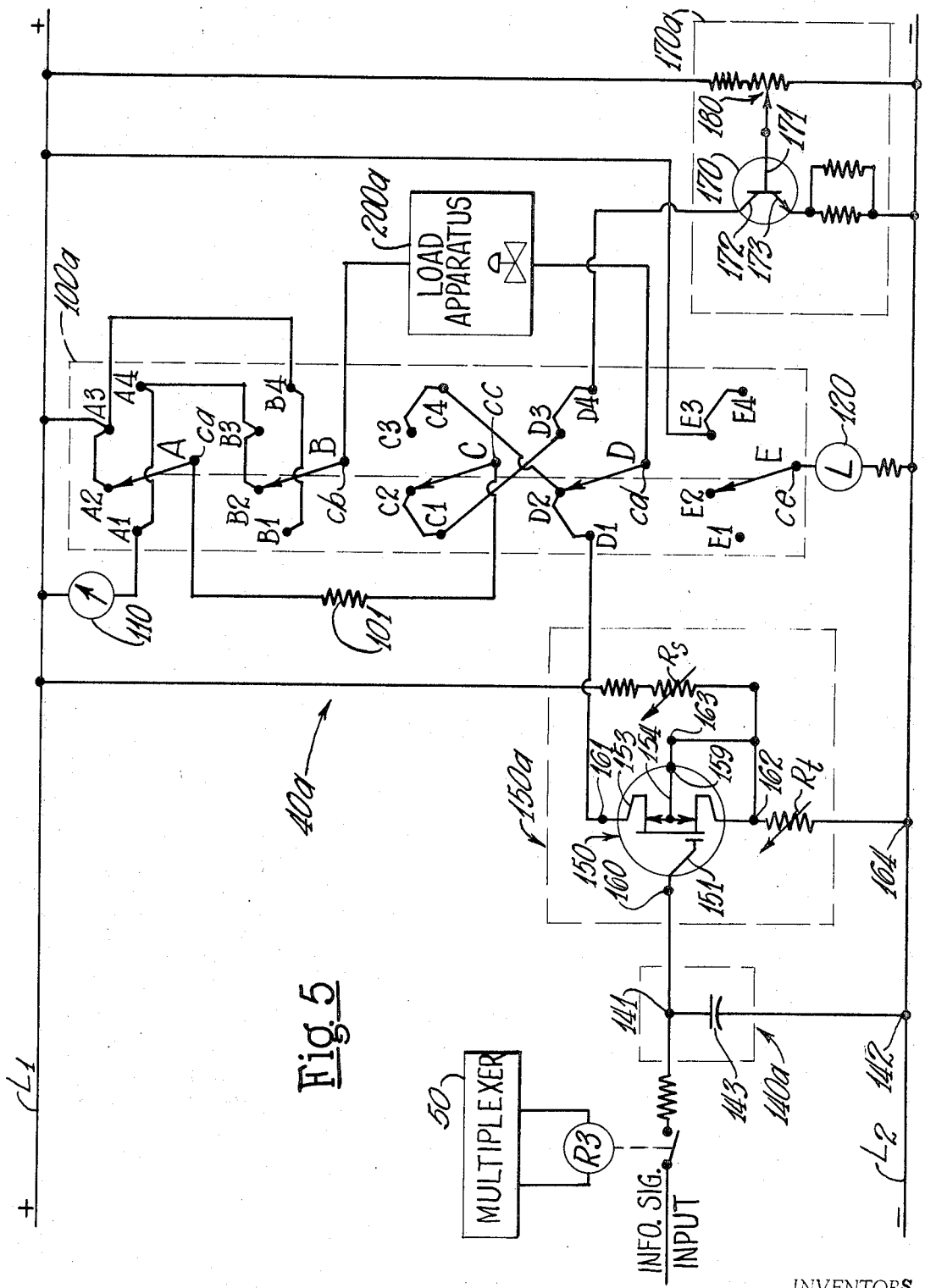

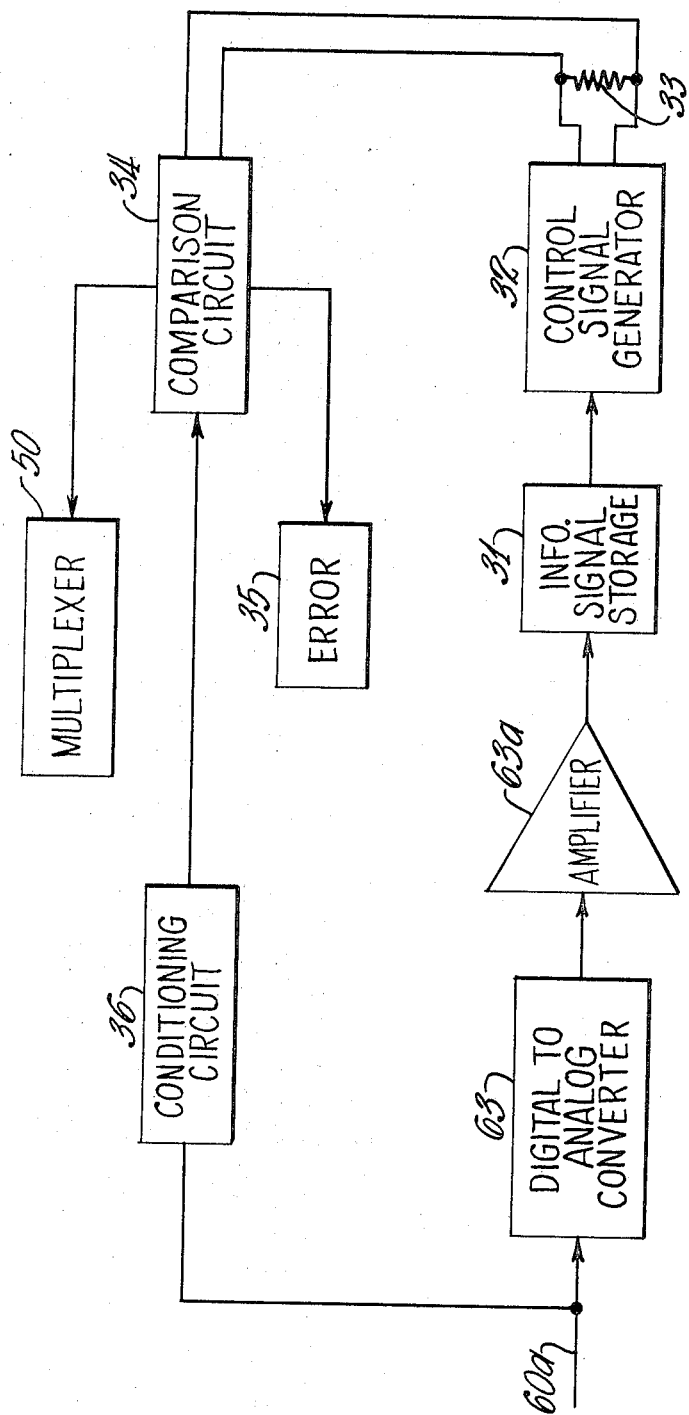

United States Patent Office 3,526,757
Patented Sept. 1, 1970

3,526,757
CONTROL APPARATUS
Vernon C. Rees and Paul D. Griem, Jr., Newark, John F. Maddux, Heath, and Robert R. Hudgins, Newark, Ohio, assignors to Owens-Corning Fiberglas, a corporation of Delaware
Filed July 25, 1967, Ser. No. 655,943
Int. Cl. G06f 11/00, 3/00
U.S. Cl. 235—153
21 Claims

ABSTRACT OF THE DISCLOSURE

Independently powered apparatus for linking a data processing unit with one or more conditions of a process to be controlled. An input station receives process signals and converts the process signals to a data signal acceptable by the data processing unit. An output station receives and stores an information signal from the data processing unit and generates a control signal. A backup signal is generated. One of the backup or control signals is selected for application to the load apparatus controlling the process. If a plurality of input or output stations are involved multiplexer means selectively connects individual stations to transmit to or receive from the data processing unit.

Computer or data processing units are increasingly used for directly controlling each individual variable or condition in a process by directly sensing the status of the conditions, calculating corrections if necessary, and directly transmitting corrective signals to load apparatus controlling the conditions. The wiring, installation, control, maintenance, and monitoring of the systems have become so complex that it is difficult to perform the above functions, particularly when space quite frequently is limited. When it is necessary to change or revise the operation of the data processing unit or convert the control of the process from one computer to another computer, a complete shutdown of the process while the transfer is made is frequently required. It is desirable to be able to continually control the process whether computers or data processing units are being changed, whether individual control loops are being checked, or when changes in the approach to or when improvements are being made to a particular portion of the process control.

It has been discovered that by providing an intermediate link which receives and stores information signals from the data processing unit for continuous control of the process, where manual control can be obtained, where various check functions can be provided, and, if desired, where all inputs are channeled therethrough for conditioning before transmission to a data processing unit, a stability of operation of both the process and the data processing can be attained. The process being controlled need not be interrupted since corrective information is stored in the linking apparatus thus providing an ability to control the process over an extended period of time.

It is an object of this invention to provide an improved control apparatus.

It is a further object of this invention to provide improved control apparatus for linking data processing units and conditions or variables to be controlled.

It is a further object of this invention to provide control apparatus for linking central processing units and a process to be controlled, which control apparatus can store information signals received from the central processing units and maintain control of the process for an extended period without receiving additional information input signals.

A still further object of this invention is to provide control apparatus for linking data processing units and a process to be controlled which may store information signals and which may generate backup signals so that the process can be controlled by either the information signals stored therein or by the backup signals as set in the linking apparatus.

Still another object of this invention is to provide linking apparatus between a data processing unit and a process to be controlled, which linking apparatus is self contained and may continue to operate the process even though the data processing unit is removed, breaks down, or is replaced with another data processing unit.

The invention features apparatus for linking a data processing unit with a condition to be controlled which comprises input station means, output station means, check station means, and multiplexing means for selectively connecting the various stations to and from the linking apparatus and the data processing unit.

An input station includes means for picking up an input signal indicating the status of the condition being controlled, means for converting the input signal to a data signal proportional thereto and acceptable to a linked data processing unit, and means for transmitting the data signal to the linked data processing unit. An output station includes means for receiving and storing an information signal from the data processing unit, means responsive to the stored information signal for generating a control signal proportional thereto, means for generating a backup signal, means for adjusting the magnitude of the backup signal, and means for selecting one of the backup and control signals for application to load apparatus controlling the condition.

For maintenance, installation, conversion to another data processing unit, etc. means are included for comparing the magnitudes of the backup and control signals while one of the signals is selected for the load apparatus. The comparing and selecting means comprises meter means and a switching means having four states. A first state of the switching means connects the meter means to read the backup signal and selects the control signal for application. A second state of the switching means connects the meter means to read the control signal and selects the control signal for application. A third state of the switching means connects the meter means to read the backup signal and selects the backup signal for application. A fourth state of the switching means connects the meter means to read the control signal and selects the backup signal for application. The above-described states of the switching means enable the backup and control signals to be balanced so that the process will not be "bumped" by sudden application of a corrective signal which varies in magnitude substantially from the signal that it has just been receiving.

A check station as described herein may have check means for receiving the information signal from the data processing unit and generating a check signal in response thereto, means for comparing the check signal and the information signal, and means responsive to the comparing means for gating the information signal to the storing means if the check and information signals compare properly. The comparison circuit may provide an error signal if the check and information signals do not compare properly.

The control signal generating means of the output station advantageously is an electronic valve means having a control electrode, a plate electrode and a cathode electrode. The control electrode means is connected to be responsive to the stored information signal thereby regulating current flow between the plate and cathode electrodes to provide a control signal proportional to the stored information signal. The valve means advantageously has a very high input impedance so that the information signal means may be a simple capacitor storage circuit connected to the control electrode means. Electronic valve means fulfilling this qualification is a field-effect transistor which has a very high input impedance.

Other objects, advantages, and features of this invention will become apparent when the following description is taken in conjunction with the accompanying drawings, in which:

FIG. 1 is a block diagram illustrating apparatus embodying the teachings of the invention;

FIG. 5 is a schematic diagram of an output module that may be utilized in the output section of the apparatus of FIG. 1; and FIG. 6 is a block diagram of a check station that may be utilized in the apparatus herein.

Figure 3:
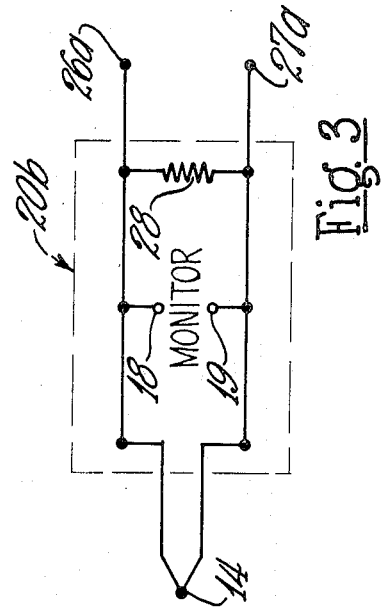
FIG. 3 is a schematic diagram of a second input module suitable for use in the apparatus of FIG. 1.

Referring to FIG. 1 there is illustrated in block diagram form apparatus embodying the teachings of this invention. A linking apparatus is indicated generally at 10 and contains an input section 20, a check section 30, and an output section 40.

A data processing unit 60 is linked with the input section 20 of apparatus 10 by amplifier 61 and analog to digital converter 62. The unit 60 is linked with output section 40 by digital to analog converters 63, 64. The data processing unit 60 may be of any type but is discussed herein as a digital computer which receives information on the status of the various conditions within the process which it is controlling, performs calculations to insure that the process is proceeding as programmed, and provides corrective output signals to load apparatus controlling the process whenever necessary.

A multiplexer 50 is adapted to select individual input stations and connect them to the central processing or data processing unit 60. The multiplexer 50 also selects individual output stations to which an information signal is to be forwarded.

Input signals noting the state of the various conditions in the process being controlled may be received through transmitters 12, 13, thermocouple sensors 14, 15 or other suitable sensing and signaling means. The receipt of signals from the transmitters, thermocouples, etc. may be continuous and an individual signal may be sampled, when the data processing unit 60 is ready, by the closure of the proper switches IS in the multiplexer 50 to gate the individual signal desired to the amplifier 61. The signal is amplified by amplifier 61 and converted from its analog state to a digital state suitable for use with the data processing unit 60.

The input signals may be conditioned in the input section 20 by, for example; converting current signals to voltage signals; changing the incoming range of a voltage signal to a range acceptable by the data processing unit or the amplifier and/or analog to digital converter feeding the signal to the data processing unit.

After calculations with the input information received, the data processing unit 60 provides an information signal to the digital to analog converters 63, 64. Switching means 65 connects terminals 65a and 65b to route an output signal from the converter 63 through the multiplexer 50 to a desired output station through switches OS in the multiplexer.

Before the information signal from converter 63 is sent to the selected output station in the output section 40, the information signal from 63 is sampled in the check section 30 and after the sample is used to generate a check control signal, the check control signal is compared to a conditioned output of the data processing unit 60. If the two outputs check then an output from the check section 30 into multiplexer section 50 to relay R1 will close multiplexer switch CS to gate the signal from the converter 63 to the output station in the output section 40 that has been selected by the multiplexer 50. If the information signal from the converter 63 and the conditioned output signal of the data processing unit 60 do not compare properly an error output is obtained which may be utilized to alert an operator to change the switching means 65 to make contact between terminals 65a and 65c to allow the spare digital to analog converter 64 to become operative. A similar check circuit may be provided for the output from the digital to analog converter 64.

All portions of the various sections of the linking apparatus disclosed and described herein may be and preferably are constructed in module form. All of the modules, including at least one power supply module to make the linking apparatus self-sustaining, may be plugged into cabinets and thus be readily available for inspection, maintenance, process monitoring through plug-in jacks by recording or other indicating equipment, error detecting, control changes, etc.

Figure 2:
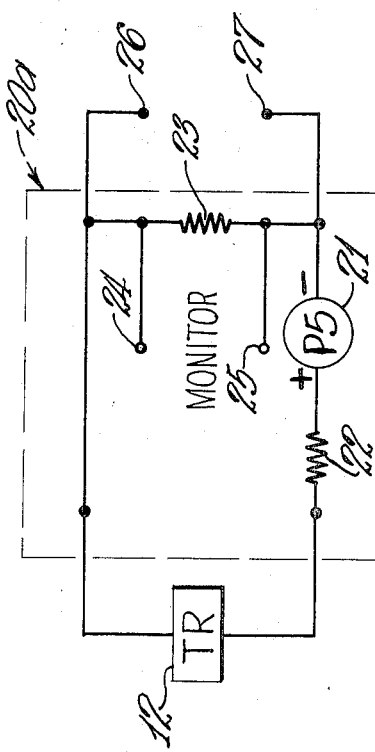
FIG. 2 is a schematic diagram of a first input module suitable for use in the apparatus of FIG. 1.

Referring to FIG. 2 there is shown a schematic diagram of a transmitter input module 20a in which a power supply 21 supplies current through resistor 22, the transmitter 12, and a monitoring resistor 23. Variations in the condition at the transmitter 12 cause a variation in the current flow through the monitor resistor 23 and thus a change in the voltage available at the output terminals 26 and 27. It will be assumed that the data processing unit which is being utilized in conjunction with the linking apparatus described herein is one that accepts inputs in terms of voltage rather than current. Thus the monitoring resistor 23 provides a voltage drop which converts the signal from the transmitter 12 into voltage magnitudes for use at the output terminals 26 and 27. The selection of the proper size of the resistances 22 and 23 converts the signal to a voltage range acceptable to the data processing unit. The input signal may be monitored by recording or other indicating equipment at terminals or plug-in jacks 24, 25.

Referring to FIG. 3 there is illustrated a thermocouple input module 20b in which a thermocouple 14 is connected to provide a voltage across resistor 28 which will appear at output terminals 26a and 27a. The output voltage from the module 20b may be monitored or recorded from terminals 18 and 19. An amplifier may be used to convert the voltage at terminals 26a, 27a to a range acceptable to the data unit 60.

Figure 4:
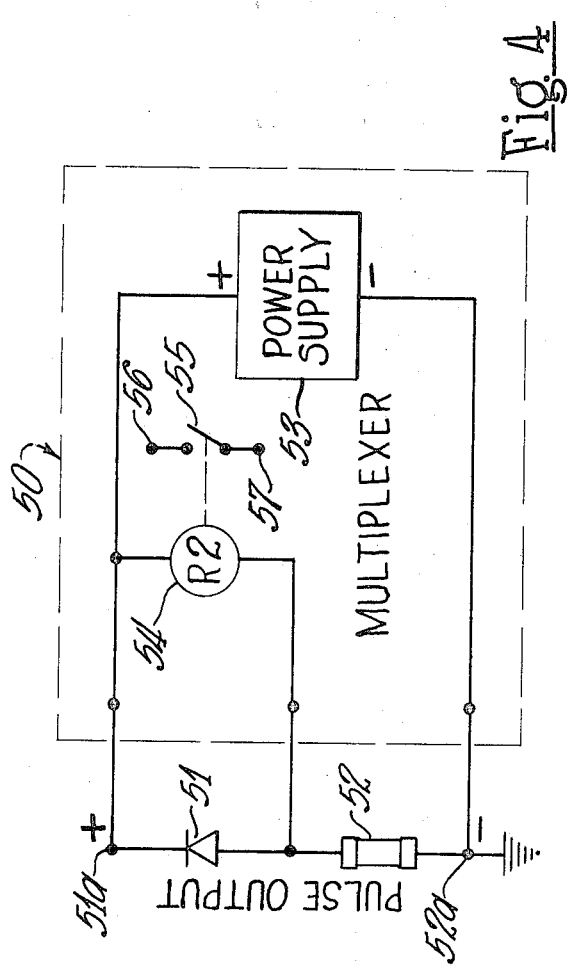
FIG. 4 is a schematic diagram of a portion of the multiplexer operation that may be utilized in the apparatus illustrated in FIG. 1.

Referring to FIG. 4 there is illustrated a section of the multiplexer 50 which may be operated by a pulse output from the data procesing unit 60. In FIG. 1 such a pulse output is connected from data processing unit 60 via lead 60b to a pulse signal operator in the multiplexer 50. In FIG. 4 a power supply 53 is provided in the multiplexer 50 having a diode 51 and a solid state switch 52 connected in series therewith. A relay 54 is connected between the positive side of the power supply 53 and the junction of the diode 51 and solid state switch 52. The relay coil 54 is linked with contact 55 which, when closed, will energize a circuit connected to terminals 56 and 57. Upon the application of a pulse output to terminals 51a and 52a the circuit is opened through solid state switch 52 allowing relay coil 54 to be energized to close contacts 55. Removal of the pulse output from terminals 51a, 52a will cause the solid state switch 52 to return to the "off" condition thus de-energizing relay coil 54 and opening contacts 55.

Referring to FIG. 5 there is illustrated a schematic of an output module 40a containing an information signal storage means 140a, a control signal generator 150a, backup signal generating means 170a, and switching means 100a for attaining the various combinations desired. Power is supplied to the output module 40a from leads L1 and L2 which are advantageously connected to a power supply module within the linking apparatus so that the linking apparatus is self-sustaining and need not depend upon the data processing unit for power.

The control signal generator 150a comprises an electronic valve means generally indicated at 150 having a very high input impedance or resistance and including a control or gate electrode means 151, a plate or drain electrode means 153, a cathode or source electrode means 152, and a second control or substrate and case electrode means 154. Terminal means 161, 162 and 164 provide means for connecting an output or load apparatus 200a and source voltage means in circuit with the plate or drain electrode means and the cathode or source electrode means.

An information signal storage means 140a includes a capacitor storage means 143 connected to the control electrode means 151 via terminal means 160. Terminal means 141 and 142 provide means for applying an information signal to the information signal storage means 140a. The capacitor means 143 is thus operative to receive and store information signals from the data processing unit. The control electrode means 151 of the control signal generator 150a is thus responsive to and controlled by the information signal stored in storage means 140a.

The electronic valve means utilized herein may be any electronic valve means having a high input resistance or impedance and capable of providing the same operation that is required in the example set forth. Advantageously, an electronic valve means of the silicon insulated-gate, field-effect transistor means such as the 3N98 and 3N99 commercially available from the Radio Corporation of America may be used in this application. These transistors have the gate offset towards the source to provide substantially reduced feedback capacitance, and a very high input resistance (in the order of $10^{15}$ ohms). The devices are relatively insensitive to temperature. The combination of low device capacitance and very high input impedance makes this particular electronic valve means especially useful in this application.

As will be noted in FIG. 5 the second control or substrate and case electrode means 154 is connected to the terminal 162 via terminal 163 to insure that this electrode means operates at substantially the same potential as the cathode or source electrode means 152. Further, via a connection 159 the second control electrode or substrate means is connected to the case of the electronic valve means 150. In operation, current flow from electrode 153 to electrode 152 is controlled by the signal present at electrode 151.

As noted in FIG. 5 the output means 200a is in a series connection with the plate or drain electrode means 153 and the B+ supply. This arrangement provides for a gain of more than one in applications where amplification is desired.

A trimming resistance $R_t$ is included in series with the cathode or source electrode means 152 so that the output of a plurality of the control signal generators may be trimmed to be substantially the same. A zero adjustment resistor $R_s$ is connected from the B+ supply or lead L1 around the load to terminal 162. That is, $R_s$ is connected between the cathode electrode means and the plate electrode means via the output or load. This allows the establishment of a "bias" voltage for the amplifying portion of the control signal generator and provides a predetermined "zero" or starting level for the output signal. The adjustable resistors $R_s$ and $R_t$ therefore provide "zero" and "span" adjustments so that units may be interchanged between various circuits without regard to the manufacturing tolerances in the electronic valve and other components.

The units 150a in conjunction with associated information signal storage units 140 adapted to receive and record an instantaneous information signal corresponding in magnitude to a computed value for the valve or other condition being controlled and hold the recorded value for use by the valve after the digital to analog converter has been switched to a subsequent control loop for which the system is to act similarly. The high input impedance of the electronic valve means allows a signal charged into a good quality condenser to be recorded or stored and fed from the condenser to the valve or other condition being controlled for adjustment without draining the condenser of the signal supplied to it. The valve of the information signal stored in the unit 140a is not necessarily the magnitude of the control signal generated by unit 150a. That is, the unit 150a may act to change the range of the signal or otherwise require a matching characteristic of the control signal to be acceptable by load apparatus 200a. Tests have shown that the units 150a and 140a in combination permit information signals to be recorded and fed to a valve or other control medium while at the same time holding the recorded or stored values for 24 hours within one percent of their original value.

A backup signal generator 170a utilizes an electronic valve 170 having a control electrode 171, a collector electrode 172 and an emitter electrode 173. The control electrode 171 is connected to an adjustable contact arm of the potentiometer 180. The potentiometer 180 is connected between the power supply leads L1 and L2. Therefore, adjustment of the movable contact arm of the potentiometer 180 changes the bias on the control electrode 171 of the electronic valve 170, regulates the current flow between electrodes 172, 173 and thus accordingly regulates the magnitude of backup signal which is generated.

It is desirable in the linking apparatus to not only be able to selectively connect a control signal from the control signal generator or a backup signal from a backup signal generator to provide information for load apparatus such as electrically controlled valves 200a, 200b, 200c, 200d, etc., but to be able to compare the magnitudes of the control and backup signals so that when the signal from either one is switched to the other there will be no "bumping" of the process which may be injurious to the load, to the signal generators, or to the data processing unit itself. In order to provide this and other functions a four-position, five-deck switch 100a is connected in the circuit of the output module 40a.

The switching means 100a is shown only symbolically in FIG. 1, but is illustrated in detail in FIG. 5. The switching means comprises decks A, B, C, D, and E, with movable contact arms in each deck connected to common terminals ca, cb, cc, cd, and ce, respectively. Each deck has four positions with contact terminals at these positions designated by the deck number and position number, such as A1, A2, A3, A4. Since the movable contact arms are ganged together when the contact arm of deck A is closed with terminal A1, the contact arm of deck B will be closed with terminal B1, the contact arm of deck C will be closed with terminal C1, etc.

In order to compare the magnitudes of the backup and control signals a meter means 110 is utilized. The meter 110 is advantageously a current meter so that there will be no need for providing compensating circuits for drift due to temperature, aging, etc., as is the case with volt meters in most situations. While the meter 110 is utilized, as will be noted hereinafter, for comparing the magnitudes of the backup and the control signal the meter means will also be used as a visual readout of the signal to the load under normal operating conditions and may be calibrated in percent of operation (e.g. valve 50% operated, etc.).

The following functions are provided by the various positions of the switching means 100a. When the switching means is in the first position, that is with the contact arm making a connection between terminals A1, ca and terminals B1, cb, etc. the meter 110 is connected to read the backup signal being generated by generating means 170a in a standby loop and connects control signal generator 150a to the load apparatus 200a. In reading the backup signal current flows from the B+ supply through the meter 110, terminals A1, ca, through current limiting resistor 101, terminals cc, C1, D3, D4, and through electronic valve 170. Current flows through the load from the B+ supply via terminals A3, B4, B1, cb through load 200a, terminals cd, D1, and through the electronic valve 150.

In the second position of the switching means 100a, the meter is connected to read the control signal which is still being applied to the load 200a and connects the backup signal loop in standby operation. Thus the control signal flows from the B+ supply through meter 110 through terminals A1, A4, B3, B2, cb, load 200a, terminals cd, D2, D1 and through control signal generator 150a. The backup signal generator is connected in a standby operation loop which begins with the B+ supply and connects through terminals A3, A2, ca, current limiting resistor 101, terminals cc, C2, C1, D3, D4, and backup signal generator 170a.

In the third position of the switch 100a the meter is connected into the backup signal loop while the backup signal loop is supplying the backup signal to the load. The control signal loop is connected into standby operation. Current flows from the B+ supply through meter 110, terminals A1, A4, B3, cb, load 200a, terminals cd, D3, D4 and through the backup signal generator 170a. The control signal generator is connected in the standby operation loop from the B+ supply via terminals A3, ca, current limiting resistor 101, terminals cc, C3, C4, D2, D1 and through the control signal generator 150a.

In the fourth position of the switching means 100a the meter is connected to read current in the control signal loop which is in standby operation, while the backup signal loop is connected to provide current for the load 200a. The meter reads current flowing from the B+ supply to terminals A1, A4, ca, through current limiting resistor 101, terminals cc, C4, D2, and D1 through the control signal generator 150a. A signal for the load apparatus 200a is supplied from the B+ lead through terminals A3, B4, cb, load 200a, terminals cd, D4 and through the backup signal generator 170a.

In positions three and four the contact arm of the deck E provides a connection between terminals E3 and E4, which are connected to the B+ supply, to energize lamp 120 to remind the operator that the process is being operated or controlled by the signal from the backup signal generator.

There has thus been provided comparing and selecting means which comprises the meter means 110 and the switching means 100a which has four states. A first state of the switching means connects the meter means to read the backup signal and selects the control signal for application to the load. A second state of the switching means connects the meter means to read the control signal and selects the control signal for application to the load. A third state of the switching means connects the meter means to read the backup signal and selects the backup signal for application to the load. A fourth state of the switching means connects the meter means to read the control signal and selects the backup signal for application to the load.

This enables the comparison of the two signals so that the one signal may be balanced before the switching means is changed from control signal generator application to the load to backup signal generator application to the load, or vice versa. It should be noted that the circuits for checking the magnitude of the signal from the signal generator not then being applied to the load are connected to "balancing" positions 1 and 4, outside of the actual "load applying" connection positions 2 and 3. This means that the operator must go back from a "balancing" position through a "load applying" position of the switching means to again compare the magnitude of that signal just set to the magnitude of the signal currently being applied to the load, before actual transfer. Therefore, an additional safety feature is provided by the switching connections as shown in FIG. 5.

Since the output module 40a of FIG. 5 is only one of many output modules a relay coil R3 and associated contacts of the multiplexer 50 are shown to note that information signal inputs to the storage means 140a are applied only when selected by the multiplexer 50.

Referring to FIG. 6 there is shown a diagrammatical illustration of the operation of a check station module. An output from the data processing unit 60 on lead 60a is fed to the digital to analog converter 63. The output of the converter 63 may be amplified by amplifier 63a and then is fed to an information signal storage means 31 in the check station. A control signal generator 32, responsive to unit 31, generates a control signal across feedback resistor 33. The units 31 and 32 may have circuits comparable to units 140a and 150a in FIG. 5. A comparison circuit 34, which may be a part of the data processing unit 60 or a separate comparison circuit, compares the output on the feedback resistor 33 with the signal derived from lead 60a of the data processing unit. The derived signal may be conditioned by circuit 36 so that a comparison may be made more easily in circuit 35.

If the two values compare properly an output is provided from the comparison circuit 34, usually a pulse output, to the multiplexer 50 to energize the relay R1 and close its associated contacts CS (see FIG. 1) to gate the signal from the digital to analog converter 63 via switching means 65 to the selected one of the output modules 40a, 40b, etc.

If the values do not compare properly, an error signal is derived from circuit 35. The error signal may be utilized to activate a lamp to remind the operator to switch switching means 65 to make contact between terminals 65a and 65c so that the spare digital to analog converter 64 may be put in use. The error signal may be utilized to activate a portion of the multiplexing unit 50 to accomplish the switching of means 65 to connect terminals 65a, 65c, as just described, automatically. That is, switching means 65 would become part of the multiplexer and responsive to an error output from circuit 35.

There has thus been described apparatus for linking a data processing unit with a plurality of conditions to be controlled which includes a plurality of input stations or modules, a plurality of output stations or modules, and multiplexer means having switching means for selectively connecting individual input stations for transmission of data signals to a data processing unit and for selectively connecting individual output stations or modules for receipt of information signals from a data processing unit. While it is not a necessity to have the input station modules as a part of the linking apparatus it is none the less desirable for the reasons set forth hereinbefore.

Each input station includes means for picking up an input signal indicating the status of a condition being controlled, means for converting the input signal to a data signal acceptable to a data processing unit, and means for transmitting the data signal to a linked data processing unit.

Each output station includes means for receiving and storing an information signal from a data processing unit, means responsive to the stored information signal for generating a control signal, means for generating a backup signal, means for adjusting the magnitude of the backup signal, and means for selecting one of the backup and control signals for application to load apparatus controlling a condition.

The linking apparatus provides for a matching of the characteristics of the input signals from the process so that signals of any type or magnitude can be arranged by the linking apparatus for use by a data processing unit, depending upon the data processing unit used. Conversely, information signals from the data processing unit regardless of their characteristics or magnitude can be matched by the output stations or modules to the range and characteristics required by the load apparatus such as a valve positioner, which is controlling the process. Therefore the process is independent of the computer used and enables the conversion between different computers without interrupting the process. The conversion to another computer, maintenance, experimentation, etc. is made possible by the linking apparatus since the signals to the process from the output stations or modules are sustained and non-interrupted without regard to the operation, non-operation, or operating characteristics of the data processing unit being utilized. The linking apparatus allows a computer or different computers to sample the input signals noting the status of the process and to examine the process in discrete sections for better coordination of calculations on related parts of the process, without interrupting the steady or continuous feedout of signals to the load apparatus controlling the process.

In conclusion it is pointed out that while the illustrated examples constitute practical embodiments of our invention, we do not limit ourselves to the exact details shown since modification may be made without departing from the spirit and scope of this invention.

We claim:

1. Apparatus for linking a data processing unit with a condition to be controlled comprising, means for picking up an input signal indicating the status of the condition being controlled, means for converting said input signal to a data signal acceptable to a linked data processing unit, means for transmitting said data signal to the linked data processing unit, means for receiving and storing an information signal from the linked data processing unit, means responsive to said stored information signal for generating a control signal, means for generating an independent backup signal, means for adjusting said backup signal to enable a transfer from said control signal to said backup signal and back without substantially disturbing the condition being controlled, and means for selecting one of said backup and control signals for application to load apparatus controlling said condition.

2. Apparatus as defined in claim 1 which further includes means for comparing said backup and control signals.

3. Apparatus as defined in claim 1 which further includes means for indicating the magnitude of said backup signal while said control signal is selected for said load apparatus.

4. Apparatus as defined in claim 1 which furhter includes means for indicating the magnitude of said control signal while said backup signal is selected for said load apparatus.

5. Apparatus as defined in claim 1 which further includes means for comparing the magnitudes of said backup and control signals while said control signal is selected for said load apparatus.

6. Apparatus as defined in claim 5 in which said comparing means comprises meter means and means for selectively connecting said meter means to said backup and said control signal generating means.

7. Apparatus as defined in claim 1 which further includes means for comparing the magnitudes of said backup and control signals while said backup signal is selected for said load apparatus.

8. Apparatus as defined in claim 7 in which said comparing means comprises meter means and means for selectively connecting said meter means to said backup and said control signal generating means.

9. Apparatus as defined in claim 1 which further includes means for comparing the magnitudes of said backup and control signals while either signal is selected for said load apparatus.

10. Apparatus as defined in claim 9 in which said comparing and selecting means comprises meter means and switching means having four states, a first state of said switching means connecting said meter means to read said backup signal and selecting said control signal for application, a second state of said switching means connecting said meter means to read said control signal and selecting said control signal for application, a third state of said switching means connecting said meter means to read said backup signal and selecting said backup signal for appliaction, and a fourth state of said switching means connecting said meter means to read said control signal and selecting said backup signal for application.

11. Apparatus as defined in claim 1 in which said receiving means includes a check station having check means for receiving said information signal and generating a check signal in response thereto, means for comparing said check signal and said information signal, and means responsive to said check and information signal comparison means for gating said information signal to said storing means if said check and information signals compare properly.

12. Apparatus as defined in claim 11 which further includes means responsive to said check and information signal comparison means for providing an error signal if said check and information signals do not compare properly.

13. Apparatus as defined in claim 1 in which said control signal generating means comprises electronic valve means having a control electrode means, a plate electrode means and a cathode electrode means; said control electrode means being connected to be responsive to said stored information signal thereby regulating current flow between said plate and cathode electrodes to provide a control signal proportional to said stored information signal.

14. Apparatus as defined in claim 13 in which said electronic valve means has a very high input impedance and said information signal storing means includes capacitive storage means connected to said control electrode means.

15. Apparatus as defined in claim 13 in which said electronic valve means comprises a field effect transistor having a very high input impedance.

16. Apparatus for linking a data processing unit with a plurality of conditions to be controlled, comprising; a plurality of input stations; each input station including means for picking up an input signal indicating the status of a condition being controlled, means for converting said input signal to a data signal acceptable to a data processing unit, and means for transmitting said data signal to a linked data processing unit; a plurality of output stations; each output station including means for receiving and storing an information signal from a data processing unit, means responsive to said stored information signal for generating a control signal, means for generatnig an independent backup signal, means for adjusting said backup signal to enable a transfer from a control signal to a backup signal and a transfer from a backup signal to a control signal without substantially disturbing the condition being controlled, and means for selecting one of said backup and control signals for application to load apparatus controlling a condition; and multiplexer means having switching means for selectively connecting individual input stations for transmission of data signals to a data processing unit and for selectively connecting individual output stations for receipt of information signals from a data processing unit.

17. Apparatus as defined in claim 16 which further includes check station means having check means for receiving said information signal and generating a check signal in response thereto, means for comparing said check signal and said information signal, and means responsive to said check and information comparison means for gating said information signal to an output station if said signals compare properly.

18. Apparatus for linking a data processing unit, which is sensing the status of and providing information signals for a condition being controlled, to a load apparatus for controlling the condition, comprising, means for receiving and storing an information signal from the linked data processing unit, means responsive to said stored information signal for generating a control signal, means for generating an independent backup signal, means for adjusting said backup signal and means for comparing said backup and control signals to enable a smooth transfer from data unit to manual or manual to data unit control of said condition, and means for selecting one of said backup and control signals for application to load apparatus controlling the condition.

19. Apparatus as defined in claim 18 in which said comparing and selecting means comprises meter means and switching means having four states, a first state of said switching means connecting said meter means to read said backup signal and selecting said control signal for application, a second state of said switching means connecting said meter means to read said control signal and selecting said control signal for application, a third state of said switching means connecting said meter means to read said backup signal and selecting said backup signal for application, and a fourth state of said switching means connecting said meter means to read said control signal and selecting said backup signal for application.

20. Apparatus as defined in claim 19 in which said meter means is a current reading means connected in a series connection to directly read the magnitude of said signals without continuous compensation to permit exact balancing and switching between signals without bumping the process.

21. Apparatus as defined in claim 19 in which said switching means is so connected as to require selection of said second state after selection of said first state and to require selection of said third state after selection of said fourth state.

References Cited

UNITED STATES PATENTS

| | | | |
|---|---|---|---|
| 2,932,005 | 4/1960 | Brightman | 340—147 |
| 3,252,149 | 5/1966 | Weida et al. | 340—172.5 |
| 3,303,474 | 2/1967 | Moore et al. | 340—172.5 |
| 3,377,623 | 4/1968 | Reut et al. | 340—172.5 |
| 3,409,877 | 11/1968 | Alterman et al. | 340—172.5 |

EUGENE G. BOTZ, Primary Examiner

C. E. ATKINSON, Assistant Examiner

U.S. Cl. X.R.

340—172.5, 147; 318—20.245; 235—151.1